S. E. PEEPLES.
INSULATED PIPE COUPLING.
APPLICATION FILED APR. 14, 1909.

969,492.

Patented Sept. 6, 1910.

Witnesses
L. B. James
C. M. Havell

Inventor
Sarah E. Peeples
By Walter W. Calmore
Attorney

UNITED STATES PATENT OFFICE.

SARAH E. PEEPLES, OF WASHINGTON, DISTRICT OF COLUMBIA.

INSULATED PIPE-COUPLING.

969,492.  Specification of Letters Patent.  Patented Sept. 6, 1910.

Application filed April 14, 1909. Serial No. 489,842.

*To all whom it may concern:*

Be it known that I, SARAH E. PEEPLES, a citizen of the United States, residing at Washington, in the District of Columbia, have invented certain new and useful Improvements in Insulated Pipe-Couplings, of which the following is a specification.

This invention relates to certain new and useful improvements in insulated couplings for gas and electric fixtures, of which the following is a full, clear, and exact description.

The primary object of the invention is to so construct the coupling that the moisture of condensation will be collected and prevented from short circuiting the insulated parts, also to prevent a surplus amount of white lead commonly used in the threaded joints from trickling down and owing to its metallic nature from electrically connecting the insulated parts of a coupling.

Figure 1:
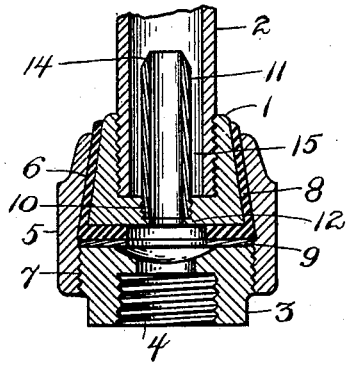
Figure 2:
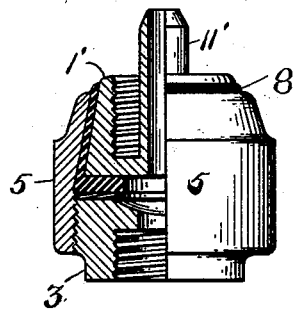

Reference will be had to the accompanying drawing forming a part of this specification and wherein like numerals of reference designate corresponding parts throughout the several views, in which:

Figure 1 is a vertical sectional view of the coupling with a fragment of the service pipe threaded therein, and Fig. 2 is a side elevation in vertical half section of a modification.

Reference numeral 1 designates a tapered coupling member into which the service pipe 2 is threaded and 3 is the other or lower coupling member into which the fixture (not shown) is threaded as at 4. These two coupling members 1 and 2 are united or coupled by a sleeve 5 having a tapered portion 6 and threaded portion 7. The upper coupling member 1 is entirely insulated by mica or other material 8 from the lower coupling member 3 and the coupling sleeve 5. A brass or other gasket 9 is arranged between the insulation and the lower coupling member to prevent injury to the insulation due to the turning of said lower coupling member 3 while being threaded into the coupling-sleeve 5. The base of the upper coupling member 1 is formed with a threaded opening 10 into which is threaded a nipple 11, a shoulder 12 limiting downward movement to prevent the nipple from being screwed down so far as to come into contact or close proximity with the lower coupling member 3 thereby effecting or rendering short circuiting possible. The upper end of the nipple is tapered as at 14 to increase as much as possible the space between the upper end of the nipple and the service pipe at that point.

It has been found that a considerable amount of moisture collects upon the inner wall of the service pipes and fixtures and this moisture collects and runs down to the coupling, and the object of this invention is to prevent the moisture from flowing through the opening in the base of coupling member 1 over the insulation and onto the lower coupling member 3 thereby forming a short circuit. This desideratum is obtained by the equipment of the coupling with the nipple 11 whereby a pocket 15 is provided for the collection of the moisture. Sufficient moisture or water cannot collect in the pocket 15 to overflow and run down the nipple as the moisture only collects at certain times and readily evaporates. In connection with these fixtures, the gas fitters sometimes use too much white lead and were it not for the nipple 11, this lead would trickle down and owing to its metallic nature would form an undesirable electrical connection or short circuit between the coupling members 1 and 3.

The construction is the same in the modification as in Fig. 1, except that the nipple 11' is formed integrally with the upper coupling member 1' instead of being threaded therein. In both forms, the tapered upper end of the nipple is to permit a large drop of moisture to pass into the pocket and not through the bore of the nipple.

Of course it will be understood that this coupling may be used for gas or for electric fixtures, or combination gas and electric fixtures, the bore of the nipple 11 being of sufficient size to permit the flow of gas.

Having fully described the invention, what is claimed as new and useful and desired to be secured by Letters Patent is:

1. A device of the character described, comprising coupling members, insulation therebetween, and collecting means located within one of the coupling members entirely above all of the insulation for preventing water of condensation or luting from coming into contact with the said insulation.

2. A device of the character described, comprising coupling members, insulation therebetween, and upwardly extending means located within one of the coupling members entirely above the insulation for preventing water of condensation or luting from coming into contact with the said insulation.

3. A device of the character described, comprising coupling members insulated from each other, a nipple located entirely within one of the coupling members and extending upwardly therefrom for preventing water of condensation or luting from flowing from one coupling to the other.

4. In a device of the character described, a coupling member provided with a service pipe attaching portion, and means extending upwardly from said coupling member to a point above the said service pipe attaching portion forming a moisture or luting collecting pocket.

5. A device of the character described, comprising coupling members, one of the members being cup-shaped and having an opening in its bottom and being adapted to receive the end of the service pipe, insulation between the base of the cup-shaped member and the other member, and means extending upwardly from the base of the cup-shaped member to intercept moisture or luting from trickling through said opening onto the insulation or adjacent coupling member.

6. A device of the character described, comprising coupling members, one thereof being cup-shaped and having an opening in its bottom and being adapted to receive the end of the service pipe, insulation between the base of the cup-shaped member and the other member and means extending upwardly from the base of the cup-shaped member and beyond the upper edge of its side wall to intercept moisture or luting from trickling through said opening onto the insulation or adjacent coupling member.

In testimony whereof I affix my signature in presence of two witnesses.

SARAH E. PEEPLES.

Witnesses:
J. D. YOAKLEY,
GEORGE L. PEEPLES.